US008018085B2

(12) United States Patent
Saito

(10) Patent No.: US 8,018,085 B2
(45) Date of Patent: Sep. 13, 2011

(54) MOBILE BODY

(75) Inventor: Tomohiro Saito, Chiryu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 650 days.

(21) Appl. No.: 12/280,043

(22) PCT Filed: Jul. 26, 2007

(86) PCT No.: PCT/JP2007/065111
§ 371 (c)(1),
(2), (4) Date: Aug. 20, 2008

(87) PCT Pub. No.: WO2008/032498
PCT Pub. Date: Mar. 20, 2008

(65) Prior Publication Data
US 2010/0167142 A1 Jul. 1, 2010

(30) Foreign Application Priority Data
Sep. 12, 2006 (JP) .................. 2006-247157

(51) Int. Cl.
B60L 1/00 (2006.01)
B60L 3/00 (2006.01)
H02G 3/00 (2006.01)
(52) U.S. Cl. ....................................... 307/9.1

(58) Field of Classification Search .................. 307/9.1, 307/44, 46, 86; 180/65.31
See application file for complete search history.

(56) References Cited

U.S. PATENT DOCUMENTS
6,920,948 B2 * 7/2005 Sugiura et al. ............. 180/65.28

FOREIGN PATENT DOCUMENTS
| JP | 09-231991 A | 9/1997 |
| JP | 2005-73475 A | 3/2005 |
| JP | 2005-243614 A | 9/2005 |
| JP | 2005-276593 A | 10/2005 |
| JP | 2007-149450 A | 6/2007 |
| JP | 2007-151346 A | 6/2007 |
| WO | 03/071615 A2 | 8/2003 |

* cited by examiner

Primary Examiner — Jared Fureman
Assistant Examiner — Carlos Amaya
(74) Attorney, Agent, or Firm — Kenyon & Kenyon LLP

(57) ABSTRACT

The present invention has a theme of a mobile body capable of securing reliability of the mobile body at a time of start. The mobile body includes a driving force generation device which generates a driving force of the mobile body; a power accumulation device and a fuel cell capable of supplying a power to the driving force generation device; and a control device which controls driving of the driving force generation device. The control device prohibits to start driving the driving force generation device by the power supply of the power accumulation device, in a case where there is a possibility of failure in startup of the fuel cell when starting the mobile body.

17 Claims, 3 Drawing Sheets

MOBILE BODY

This is a 371 national phase application of PCT/JP2007/065111 filed 26 Jul. 2007, which claims priority to Japanese Patent Application No. 2006-247157 filed 12 Sep. 2006, the contents of which are incorporated herein by reference.

TECHNICAL FIELD

The present invention relates to a mobile body such as a fuel cell car. More particularly, it relates to a mobile body including a power accumulation device and a fuel cell as supply devices of a power to a driving force generation device typified by a traction motor.

BACKGROUND ART

A fuel cell is constituted by laminating a large number of unit cells each capable of generating a power. Heretofore, as a vehicle on which a fuel cell system is mounted, a vehicle is known in which a traction motor is driven by power supply from a secondary battery and a fuel cell (e.g., see Japanese Patent Application Laid-Open No. 9-231991). In this publication, it is disclosed that when starting the vehicle, the traction motor is driven by the power supply from the secondary battery only, until power generation of the fuel cell is stabilized. Then, after the power generation of the fuel cell is stabilized, the traction motor is driven using the fuel cell.

DISCLOSURE OF THE INVENTION

When the fuel cell left to stand in a stopped state for a long period is started up, power generation of a part of unit cells can become abnormal, and a cell voltage can decrease. Despite such a decrease of the cell voltage might occur, when the traction motor starts to be driven only with the secondary battery at a time of start as in the vehicle described in Japanese Patent Application Laid-Open No. 9-231991, the startup of the fuel cell might fail during run with the secondary battery. As a result, a power supply source of the traction motor is the secondary battery only, but there is a limit to an amount of the power to be accumulated in the secondary battery. Therefore, the vehicle might stop on a road.

An object of the present invention is to provide a mobile body capable of securing reliability of the mobile body at a time of start.

To achieve the above object, a mobile body of the present invention comprises a driving force generation device which generates a driving force of the mobile body, a power accumulation device capable of supplying a power to the driving force generation device, a fuel cell capable of supplying a power to the driving force generation device, and a control device which controls driving of the driving force generation device. The control device prohibits to start driving the driving force generation device by the power supply of the power accumulation device, in a situation in which there is a possibility of failure in startup of the fuel cell when starting the mobile body.

In consequence, for example, after obtaining a state in which the power can be supplied to the driving force generation device from both the fuel cell and the power accumulation device, it is possible to start driving the driving force generation device. Accordingly, it can be inhibited that any driving force cannot be transmitted to the mobile body which has failed in the startup of the fuel cell after the start, and reliability of the mobile body at the time of the start can be secured.

Here, the power accumulation device is, for example, a chargeable/dischargeable secondary battery or a capacitor, but is not limited to this example. The driving force generation device is, for example, a traction motor, but is not limited to this example. The mobile body is, for example, a two-wheeled or four-wheeled car, a train, an airplane, a ship or a robot and is self-propellable, but a vehicle is preferable according to one aspect.

Preferably, in the above situation, the control device allows to start driving the driving force generation device after completion of the startup of the fuel cell or simultaneously with the completion of the startup.

In consequence, while securing reliability of the mobile body at the time of the start, the mobile body can be started in a short time. In this case, a power supply source which starts driving the driving force generation device may be either the power accumulation device or the fuel cell.

Preferably, while prohibiting to start driving the driving force generation device by the power supply of the power accumulation device, the control device may execute a restoring operation to remove a factor for failure in the startup of the fuel cell.

In consequence, for example, the decrease of the cell voltage of the fuel cell can be suppressed or restored, so that the startup of the fuel cell can stably be performed.

Preferably, the control device may judge based on a situation before the startup of the fuel cell whether or not there is a possibility of the failure in the startup of the fuel cell.

In consequence, it is possible to execute start control in which the driving of the driving force generation device is not uniformly prohibited. Here, examples of the situation before the startup of the fuel cell include an abnormal situation during the previous power generation of the fuel cell, and a time for which the fuel cell is left to stand during stop.

Preferably, the mobile body includes a timer to measure the time for which the fuel cell is left to stand during the stop. Moreover, the control device may determine based on the leaving time measured by the timer whether to prohibit or allow to start driving the driving force generation device by the power supply of the power accumulation device when starting the mobile body.

In consequence, in a case where the fuel cell is left to stand for such a long period that abnormality of the fuel cell is comparatively easily generated, it can be prohibited to start driving the driving force generation device by the power supply of the power accumulation device. In consequence, the reliability of the mobile body at the time of the start can be secured. On the other hand, in a case where the fuel cell is left to stand for such a short period that the abnormality of the fuel cell is not comparatively easily generated, it can be allowed to start driving the driving force generation device by the power supply of the power accumulation device. In consequence, a start time of the mobile body can be reduced.

Preferably, the mobile body includes storage means for storing whether or not there was any abnormality during a previous power generation of the fuel cell. Then, the control device may determine based on the storage of the storage means when starting the mobile body whether to prohibit or allow to start driving the driving force generation device by the power supply of the power accumulation device.

In a case where there was an abnormality during the previous power generation of the fuel cell, there is a possibility of failure at the next startup of the fuel cell. Therefore, according to the present invention, in such a case, it can be prohibited to start driving the driving force generation device by the power supply of the power accumulation device. Therefore, the reliability of the mobile body at the time of the start can be secured. On the other hand, in a case where the previous power generation of the fuel cell was normal, there is a high possibility that the next startup of the fuel cell is normally performed. Therefore, according to the present invention, in such a case, it can be allowed to start driving the driving force generation device by the power supply of the power accumulation device. Therefore, the start time of the mobile body can be reduced.

BEST MODE FOR CARRYING OUT THE INVENTION

A preferable embodiment of the present invention will hereinafter be described with reference to the accompanying drawing. Here, an example will be described in which the fuel cell system is mounted on a vehicle as a typical example of a self-propelled mobile body.

Figure 1:
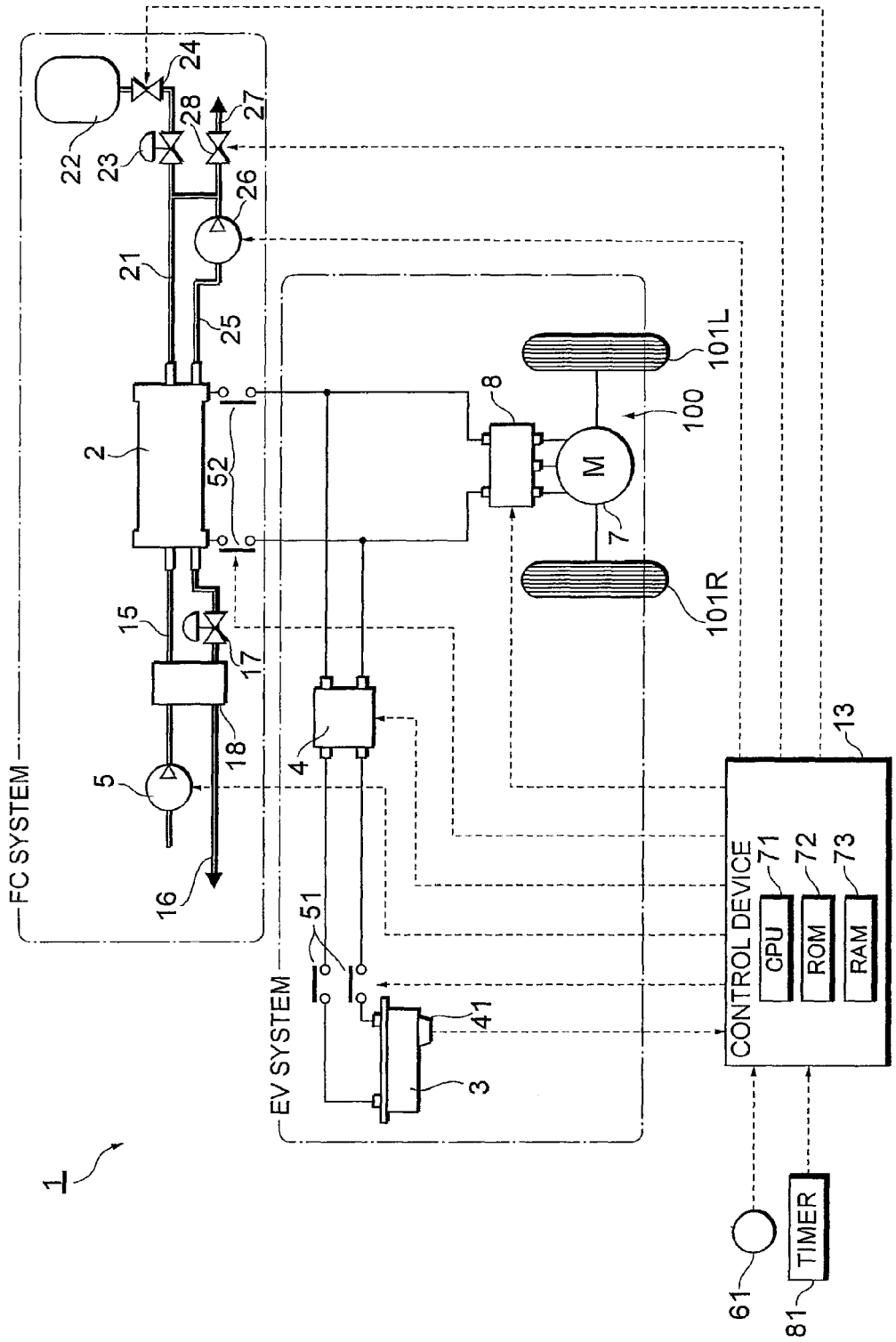
FIG. 1 is a constitution diagram schematically showing a fuel cell system mounted on a vehicle.
Figure 3:
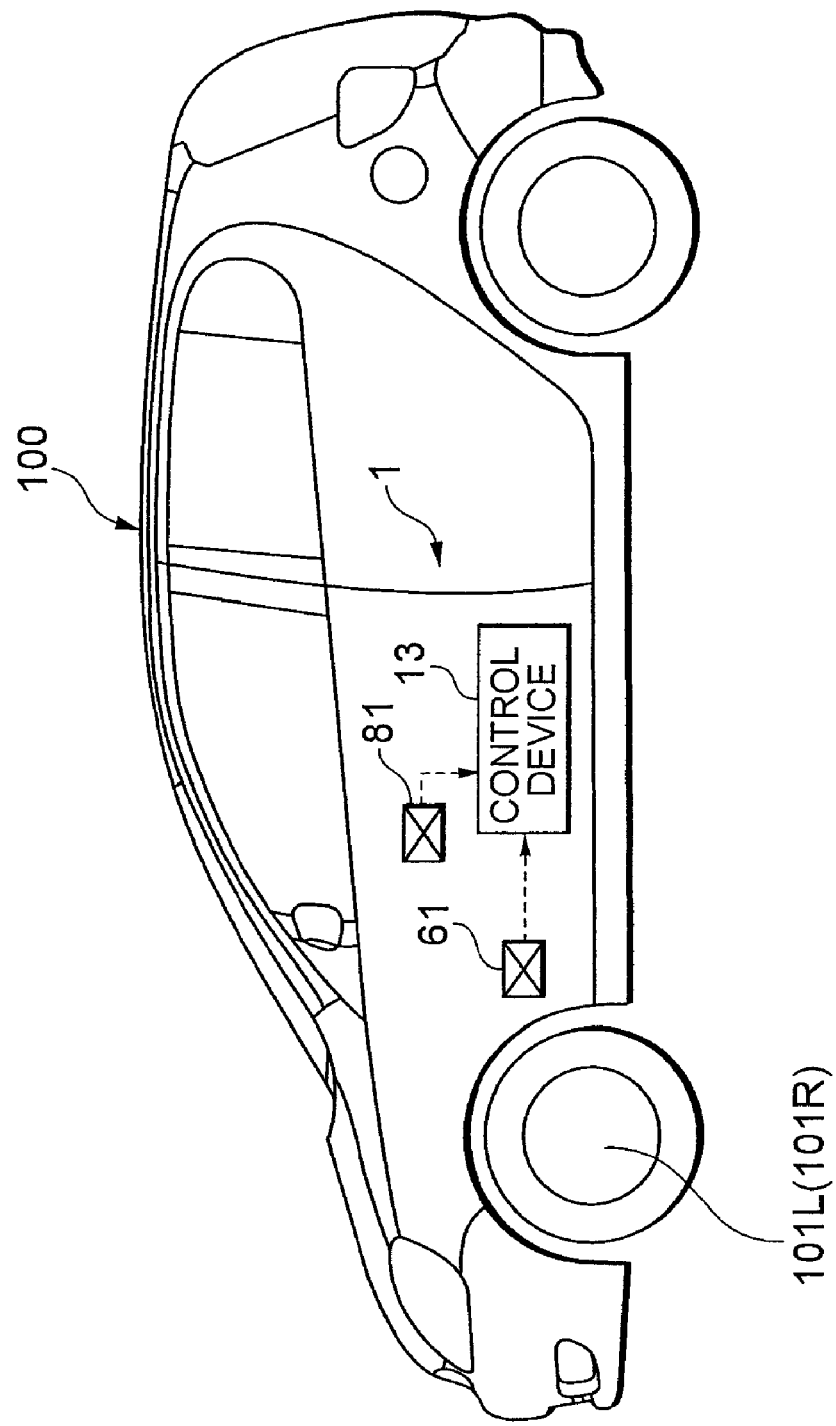
FIG. 3 is a side view of the vehicle.

As shown in FIGS. 1 and 3, a vehicle 100 runs using, as a driving force source, a traction motor 7 (a power generation device) connected to wheels 101L, 101R. A power source of the traction motor 7 is a fuel cell system 1 including a fuel cell 2 and a power accumulation device 3. A direct current output from the fuel cell system 1 is converted into a three-phase alternating current by an inverter 8 and supplied to the traction motor 7. During braking of the vehicle 100, the traction motor 7 is driven by the wheels 101L, 101R, and the traction motor 7 functions as a power generator to generate the three-phase alternating current. This three-phase alternating current is converted into the direct current by the inverter 8 to charge the power accumulation device 3.

The traction motor 7 is an electric motor for obtaining an impulsive force of the vehicle run, and is constituted of, for example, a three-phase synchronous motor. A maximum output of the traction motor 7 is, for example, 80 kW. The traction motor 7 can be used as an in-wheel motor, and a two-wheeled or four-wheeled driving constitution can be employed. In this case, two or four inverters 8 are connected in parallel with an output terminal of the fuel cell 2, and the respective inverters 8 may be connected to the traction motor 7. It is to be noted that when a direct-current motor is used as the traction motor 7, the inverter 8 is not required.

The fuel cell system 1 includes the fuel cell 2, the power accumulation device 3, a high-voltage DC/DC converter 4, a control device 13 and the like. The power accumulation device 3 is connected in parallel with the fuel cell 2 via the high-voltage DC/DC converter 4. The high-voltage DC/DC converter 4 is connected between the power accumulation device 3 and the inverter 8.

The fuel cell 2 includes a stack structure in which a large number of unit cells are laminated. There are various types of the fuel cell 2, for example, a phosphoric acid type and a solid oxide type. The fuel cell 2 of the present embodiment is constituted of a solid polymer electrolytic type which can start up at ordinary temperature and in which a startup time is comparatively short. The fuel cell 2 generates a power by an electrochemical reaction of an oxide gas and a fuel gas, and a maximum output of the fuel cell is, for example, 90 kW. Water is produced in the fuel cell 2 by this electrochemical reaction.

An oxide gas fed under pressure by an air compressor 5 flows through a supply path 15, and is supplied to an air electrode (a cathode) in the fuel cell 2. An oxide off-gas used in a cell reaction of the fuel cell 2 flows through an off-gas channel 16 and is discharged outside. The off-gas channel 16 is provided with a pressure regulation valve 17 which regulates a pressure of the oxide gas to be supplied to the fuel cell 2, and a humidifier 18 for humidifying the oxide gas with the oxide off-gas.

A hydrogen gas as the fuel gas flows through a supply path 21, and is supplied to a hydrogen electrode (an anode) in the fuel cell 2. The hydrogen gas is supplied to the fuel cell 2 from, for example, a hydrogen storage source 22 such as a high-pressure hydrogen tank provided on an upstream side of the supply path 21 via a regulator 23. The supply path 21 is provided with a shutoff valve 24 which allows to supply the hydrogen gas of the hydrogen storage source 22 to the supply path 21 or which stops the supply. It is to be noted that the hydrogen gas generated by modifying a material such as alcohol or a compressed natural gas may be supplied to the fuel cell 2.

A hydrogen off-gas used in the cell reaction of the fuel cell 2 is discharged to an off-gas path 25, returned to the supply path 21 by a hydrogen pump 26 and supplied to the fuel cell 2 again. A discharge path 27 is branched and connected to the off-gas path 25. A purge valve 28 on the discharge path 27 appropriately opens during an operation of the fuel cell system 1, whereby impurities in the hydrogen off-gas are discharged together with the hydrogen off-gas to a downstream side of the discharge path 27. In consequence, a concentration of the impurities in the hydrogen off-gas along a hydrogen circulation line lowers, and a concentration of hydrogen in the hydrogen off-gas to be circulated and supplied can be raised. It is to be noted that the water produced by the fuel cell 2 is discharged to the downstream side of the discharge path 27 together with the hydrogen off-gas to be purged, or discharged from the system via a gas-liquid separator (not shown).

The power accumulation device 3 is a chargeable/dischargeable secondary battery which functions as a high-voltage power accumulation device. The power accumulation device 3 is, for example, a nickel hydrogen cell or a lithium ion cell, but a capacitor other than the secondary battery may be used. A charge amount of the power accumulation device 3 is detected by an SOC sensor 41.

The power accumulation device 3 assists the power in a state in which an output power of the fuel cell 2 only is insufficient, for example, during acceleration transition or high-load operation of the vehicle 100. Moreover, when the operation of the fuel cell 2 is stopped or it is preferable from a viewpoint of efficiency to stop the operation, for example, during stop of the vehicle 100 or during low load run thereof, the vehicle 100 runs only with the power of the power accumulation device 3. A power capacity of the power accumulation device 3 can appropriately be set in accordance with run conditions of the vehicle 100, a run performance such as a maximum speed, a vehicle weight or the like. A maximum output of the power accumulation device 3 is smaller than that of the fuel cell 2, and is, for example, 20 kW.

The high-voltage DC/DC converter 4 is a direct-current voltage converter. The high-voltage DC/DC converter 4 has a function of adjusting the direct-current voltage input from the power accumulation device 3 to output the voltage toward the inverter 8, and a function of adjusting the direct-current voltage input from the fuel cell 2 or the traction motor 7 to output the voltage to the power accumulation device 3. These functions of the high-voltage DC/DC converter 4 realize charging and discharging of the power accumulation device 3. An output voltage of the fuel cell 2 is controlled by the high-voltage DC/DC converter 4.

A relay 51 (first shutoff means) which can shut off the power supply from the power accumulation device 3 to the inverter 8 is provided between the high-voltage DC/DC converter 4 and the power accumulation device 3. A relay 52 (second shutoff means) which can shut off the power supply from the fuel cell 2 to the inverter 8 is provided between the high-voltage DC/DC converter 4 and the fuel cell 2.

Although not shown, various auxiliary machines for use in the operation of the fuel cell 2 are connected between the high-voltage DC/DC converter 4 and the fuel cell 2 via an inverter. In the present embodiment, the auxiliary machines correspond to the air compressor 5, the hydrogen pump 26 and the like. During a usual operation of the fuel cell 2, the power of the fuel cell 2 does not flow through the high-voltage DC/DC converter 4, and is supplied to the auxiliary machines (5 and 26). On the other hand, during the operation stop of the fuel cell 2 and in the beginning of the start, the power of the power accumulation device 3 is supplied to the auxiliary machines (5 and 26) via the high-voltage DC/DC converter 4.

The control device 13 is constituted as a microcomputer including therein a CPU 71, an ROM 72 and an RAM 73. The CPU 71, the ROM 72 and the RAM 73 are connected to one another via a bus, and this bus is connected to an input/output interface (not shown).

The CPU 71 executes desired calculation according to a control program to perform various processing and control such as start control of the vehicle 100 described later. The ROM 72 stores the control program and control data to be processed by the CPU 71. The RAM 73 is used as various operation areas mainly for control processing. Especially, the RAM 73 functions as storage means for storing whether or not there has been an abnormality during the power generation of the fuel cell 2 in one cycle of the fuel cell 2, that is, from the startup of the fuel cell 2 to the stop thereof. It is to be noted that such storage means may be constituted of an external device such as a hard disc instead of the RAM 73.

The control device 13 is connected, via the input/output interface, to the SOC sensor 41 and various pressure and temperature sensors for use in a gas system of the oxide gas and the hydrogen gas and a cooling system. Moreover, the control device 13 is connected, via the input/output interface, to an accelerator pedal position sensor 61 which detects an accelerator open degree of the vehicle 100, and a timer 81 to measure a time for which the fuel cell 2 is left to stand during the stop, in addition to a snaking angle sensor and a vehicle speed sensor.

The control device 13 receives output signals of the above sensors to calculate a system required power (e.g., a sum of a vehicle run power and an auxiliary machine power) to control operations of various devices in the system 1. Specifically, the control device 13 obtains the system required power based on the accelerator open degree, the vehicle speed or the like, and executes control so that the output power of the fuel cell 2 matches a target power.

Here, the vehicle run power means a required power of the traction motor 7, and the auxiliary machine power means a total of powers required for the operations of the various auxiliary machines in the fuel cell system 1. The required power of the traction motor 7 is calculated by the control device 13 based on the accelerator open degree, the vehicle speed and the like. This required power is calculated by obtaining a power to be output from the traction motor 7 from a product of a target rotation number and a target torque of the traction motor 7, and dividing this power by an operation efficiency of the traction motor 7, that is, a ratio of the power to be output per power consumption. It is to be noted that when the traction motor 7 is operated as a power generator to perform regenerative braking, a target torque becomes a negative value, and therefore the required power becomes a negative value.

After calculating the required power of the traction motor 7, the control device 13 calculates the auxiliary machine power corresponding to the required power of the traction motor 7. Then, the control device 13 controls the operation of the high-voltage DC/DC converter 4 so as to supply the system required power, and adjusts an operation point (an output voltage, an output current) of the fuel cell 2. At this time, the control device 13 controls switching of the inverter 8 to output the three-phase alternating current corresponding to the vehicle run power to the traction motor 7. Moreover, the control device 13 adjusts rotation numbers of motors (not shown) of the air compressor 5 and the hydrogen pump 26, whereby the fuel cell 2 controls supply of the oxide gas and the hydrogen gas in accordance with the target power and the cooling system (not shown) controls the temperature of the fuel cell 2.

Here, as shown in FIG. 1, a control system of the fuel cell system 1 can be divided into functions of an FC system including the fuel cell 2 and an EV system including the power accumulation device 3. The FC system functions mainly as a power source of a run power. The EV system functions mainly as a power source for efficiently using the output power of the fuel cell 2. In the FC system, the relay 52 is closed, so that the power of the fuel cell 2 can be supplied to the traction motor 7. In the EV system, the relay 51 is closed, so that the power of the power accumulation device 3 can be supplied to the traction motor 7.

In the above constitution, the control device 13 changes a timing to start driving the traction motor 7, depending on whether or not there is a possibility of failure in the startup of the fuel cell 2 when starting the vehicle 100. The start control of this vehicle 100 will be described with reference to FIGS. 2A and B.

Figure 2:
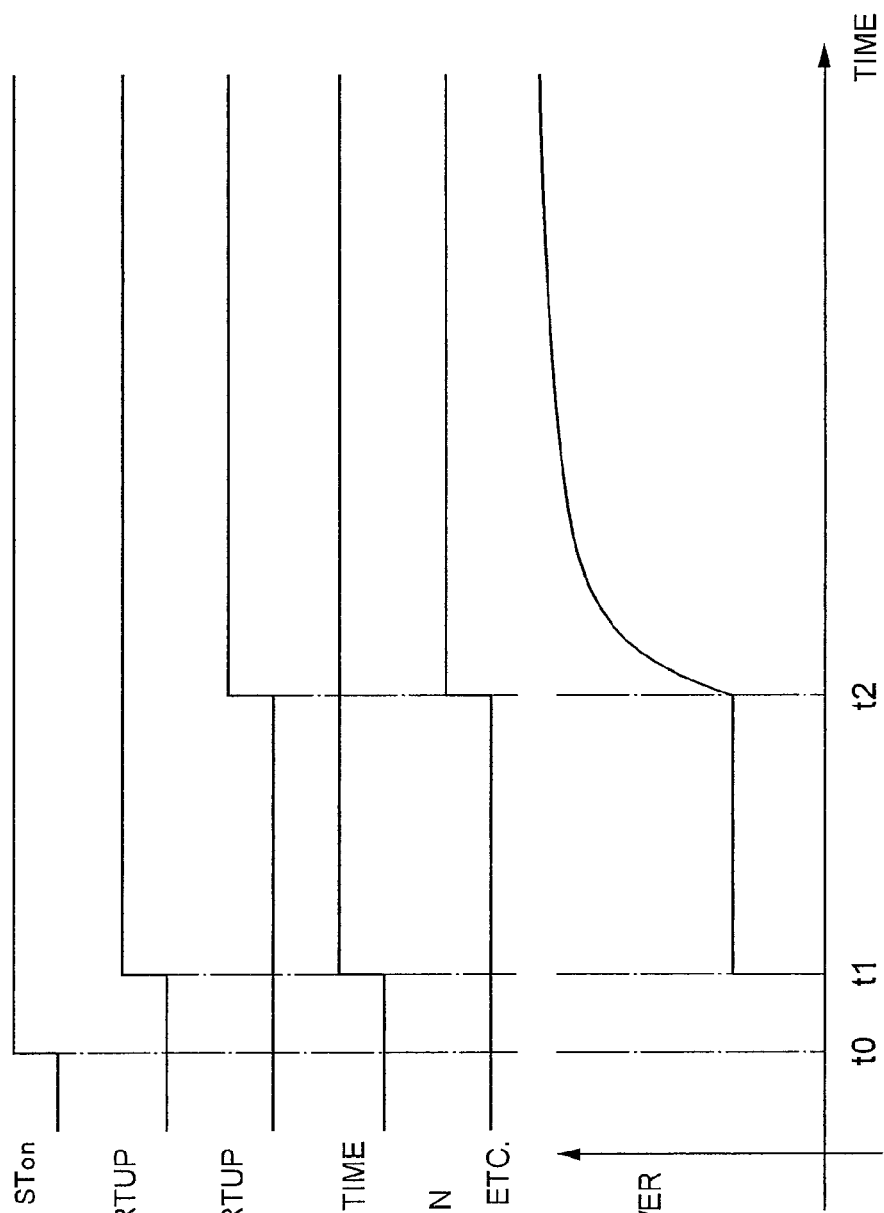
FIG. 2A is a timing chart showing control when starting the vehicle.
FIG. 2B is a diagram corresponding to FIG. 2A, and is a graph showing a relation between a time and an upper limit of a power usable during run of the vehicle at a time when "usual ready on" is executed.

It is to be noted that FIG. 2A is a timing chart showing control when starting the vehicle 100, and FIG. 2B is a graph showing a relation between a time and an upper limit of a power usable in the vehicle run at a time when "ready on" is executed. Here, "ready on" is to allow the driving of the traction motor 7, that is, to allow the run start (start) of the vehicle 100.

The fuel cell system 1 is stopped until STon is performed (till a timing t0) as shown in FIG. 2A. That is, the relays 51, 52 are opened, respectively, and in the EV system and the FC system, the power supply to the traction motor 7 is shut off.

Here, STon is an abbreviation of "START ON", and means that an operation of the fuel cell system 1 is started. That is, at the timing of STon, the fuel cell system 1 starts the operation so that the power of the fuel cell system 1 is used in the vehicle 100. An operation of STon is performed by an operation necessary for starting up the fuel cell system 1 to start the vehicle 100, for example, by operating a starter switch by a driver of the vehicle 100.

When STon is performed to obtain a predetermined timing t1, "EV system startup completion" results. The "EV system startup completion" means a state in which the relay 51 of the EV system is closed and the traction motor 7 can be driven by the power of the power accumulation device 3.

From the timing t1 to a timing t2 after an elapse of a predetermined time t1, "FC system startup completion" results. The "FC system startup completion" means a state in which the relay 52 of the FC system is closed and the traction motor 7 can be driven by the power of the fuel cell 2. In more detail, "FC system startup completion" is a state in which system check of the fuel cell system 1 is completed, the fuel cell 2 can be started up without any failure (in other words, a state in which the power can stably be generated), and the traction motor 7 can be driven by the generated power. It is to be noted that the system check is to check whether or not there is a trouble in constituting elements (various sensors, valves, pumps, etc.) of the fuel cell system 1.

Therefore, when STon is performed, the power accumulation device 3 is brought into a state in which the device can supply the power to the traction motor 7, before the fuel cell 2.

FIG. 2B shows transition of the power usable in the vehicle run (i.e., the power upper limit) in a case where "ready on" is executed at the timing t1 of "EV system startup completion". As shown in FIG. 2B, the power upper limit from the timing t1 to the timing t2 corresponds to the maximum output of the power accumulation device 3, and is 25 kW according to the above example. The power upper limit after the timing t2 corresponds to a value obtained by adding the output of the fuel cell 2 to the maximum output of the power accumulation device 3, and gradually increases with the time.

A timing of "ready on" to be set is determined in accordance with the presence of the possibility of the failure in the startup of the fuel cell 2. Specifically, it is judged based on the situation before the startup of the fuel cell 2 whether or not the fuel cell 2 fails in the startup, and the timing of "ready on" is set based on the judgment result.

For example, in a case where a time for which the fuel cell 2 is left to stand during the stop, measured by the timer 81, is a short time, or a predetermined threshold value or less, it is judged that there is not any possibility of failure in the startup of the fuel cell 2 or there is a low possibility. Here, the time for which the fuel cell 2 is left to stand during the stop is a time from the stop of the power generation of the fuel cell 2 to the startup for the next power generation, or a time from the stop of the operation of the fuel cell system 1 to the start of the next operation.

Moreover, in a case where it is judged that there is not any possibility of the failure in the startup of the fuel cell 2 or there is a low possibility, the control device 13 sets "ready on" to the timing t1. Under this setting, it is allowed to start driving the traction motor 7 by the power supply only from the power accumulation device 3, and the starting is executed to start the vehicle 100. Afterward (after the timing t2), the power supply to the traction motor 7 switches from the output of the power accumulation device 3 to the output of the fuel cell 2. It is to be noted that when passing acceleration is started from a stationary state, the power of the power accumulation device 3 is supplied to the traction motor 7 again to assist the fuel cell 2.

On the other hand, in a case where the time for which the fuel cell 2 is left to stand during the stop, measured by the timer 81, is a long time or exceeds the predetermined threshold value, the control device 13 judges that there is a possibility of the failure in the startup of the fuel cell 2. Such judgment is made because when the fuel cell 2 does not generate any power for a long period, there is a possibility that certain abnormality or disadvantage is generated in the fuel cell 2. As the certain abnormality or disadvantage generated in the fuel cell 2, for example, water in the fuel cell 2 is partially high or low as compared with a normal time. In either case, for example, a phenomenon of a voltage decrease in at least a part of the unit cells of the fuel cell 2 easily occurs, and there is a possibility of the failure in the startup of the fuel cell 2.

To solve the problem, in a case where it is judged that there is a possibility of the failure in the startup of the fuel cell 2, the control device 13 sets "ready on" to the timing t2. Under this setting, first at the timing t2, the driving of the traction motor 7 is started by the power supply of the fuel cell 2 or the power accumulation device 3, and the vehicle 100 starts. That is, when starting the vehicle 100, it is prohibited to start driving the traction motor 7 by the power supply of the power accumulation device 3.

Then, when "ready on" is set to the timing t2, the control device 13 executes a restoring operation for removing a factor for the failure in the startup of the fuel cell 2 between the timings t1 and t2. In consequence, the decrease of the cell voltage of the fuel cell 2 can be suppressed, and the startup of the fuel cell 2 can stably be performed.

Such restoring operation of the fuel cell 2 can be executed by supplying the power of the power accumulation device 3 to pass a predetermined gas or the like through the fuel cell 2. For example, in a case where it is judged by an alternating-current impedance method that there is a wet state (a wetted state) in the fuel cell 2, the shutoff valve 24 is opened to supply the hydrogen gas to the fuel cell 2. The water in the fuel cell 2 is carried away by this supplied hydrogen gas to return the fuel cell 2 to a normal humidified state. On the other hand, in a case where it is judged that there is a dry state (a dried state) in the fuel cell 2, a humidifying gas may be supplied into the fuel cell 2. In this case, for example, the air compressor 5 may be driven to supply, to the fuel cell 2, an oxide gas passed through the humidifier 18 or an oxide gas passed through a humidifying device disposed in a path (not shown) different from that of this humidifier. An apparatus (the shutoff valve 24 or the air compressor 5) is driven by the power supply of the power accumulation device 3 so as to supply the hydrogen gas or the oxide gas to the fuel cell 2, whereby the restoring operation is executed. This apparatus is not limited to the shutoff valve 24 or the air compressor 5, and any apparatus may be driven as long as the supply of the gas to the fuel cell 2 and the stop of the supply are executed.

An operation and an effect of the present embodiment will be described.

Unlike the present embodiment, in a case where there is a possibility of the failure in the startup of the fuel cell 2, "ready on" is set to the timing t1, whereby the vehicle 100 is continued to run by the power accumulation device 3. At this time, when the fuel cell 2 actually fails in the startup, an amount of the power to be accumulated in the power accumulation device 3 comes short, the three-phase alternating current corresponding to the vehicle run power cannot be output to the traction motor 7, and hence there is a possibility that the vehicle 100 has to be stopped on the road.

On the other hand, in a case where there is a possibility of the failure in the startup of the fuel cell 2, "ready on" is set to the timing t2 as in the present embodiment, whereby the vehicle 100 can be started in a state in which stability of the power generation of the fuel cell 2 is secured. In consequence, it can be inhibited that the vehicle 100 continues to run only with the power accumulation device 3, and it can be inhibited that the vehicle 100 has to halfway stop on the load. Therefore, according to the present embodiment, the reliability of the vehicle 100 at the time of the start can be secured.

Moreover, according to the present embodiment, simultaneously with "FC system startup completion", that is, simultaneously with a state in which the fuel cell 2 can stably generate the power, the traction motor 7 can start to be driven. In consequence, while securing the reliability of the vehicle 100 at the time of the start, the vehicle 100 can be started in a short time. In a case where there is not any possibility of the failure in the startup of the fuel cell 2 or there is a low possibility, the driving of the traction motor 7 by the power supply of the power accumulation device 3 can be started, so that the start time of the vehicle 100 can be reduced at such a usual time.

According to another embodiment, the timing to start driving the traction motor 7 may not be simultaneous with "FC system startup completion", but needs to be after "FC system startup completion".

Next, a modification of the start control of the vehicle 100 will be described.

In the present modification, it is judged based on an abnormal situation during the previous power generation of a fuel cell 2 whether or not startup of the fuel cell 2 fails, and a timing of "ready on" is set based on the judgment result.

Specifically, in a case where storage means such as an RAM 73 stores that there was not any abnormality during the previous power generation of the fuel cell 2, a control device 13 judges that there is not any possibility of the failure in the startup of the fuel cell 2 this time or there is a low possibility. Then, when such judgment is made, "ready n" is set to the timing t1 in the same manner as described above. It is to be noted that the previous power generation of the fuel cell 2 is so-called pre-trip, and is one cycle of the fuel cell 2 right before this-time startup.

In a case where storage means such as the RAM 73 stores that there was not any abnormality in the fuel cell 2 during the previous power generation of the fuel cell 2, the control device 13 judges that there is a possibility of the failure in the startup of the fuel cell 2. This judgment is made because when there is the abnormality in the fuel cell 2 during the previous power generation, there is a possibility of the failure in the next startup. With regard to a cause for this possibility, in the same manner as described above, for example, water in the fuel cell 2 is partially high or low as compared with a normal time.

To solve the problem, in a case where it is judged that there is a possibility of the failure in the startup of the fuel cell 2, in the same manner as described above, "ready on" is set to the timing t2, and it is prohibited to start driving the traction motor 7 by the power supply of the power accumulation device 3. Then, in the same manner as described above, the restoring operation of the fuel cell 2 is executed from the timing t1 to t2.

Therefore, according to the present modification, the abnormal situation of the fuel cell 2 during the previous power generation, stored in the storage means, is read. When there is a possibility of the failure in the startup of the fuel cell 2, the timing t2 is determined as the timing of "ready on". In consequence, the vehicle 100 can be started in a state in which the power generation stability of the fuel cell 2 is secured, and it can be inhibited that the vehicle 100 has to halfway stop on the road.

Therefore, even according to the present modification, the reliability of the vehicle 100 at the time of the start can be secured. Moreover, in the same manner as in the above embodiment, simultaneously with "FC system startup completion", the traction motor 7 can start to be driven. On the other hand, in a case where there is not any possibility of the failure in the startup of the fuel cell 2 or there is a low possibility, the driving of the traction motor 7 can be started by the power supply of the power accumulation device 3, so that the start time of the vehicle 100 can be reduced at such a usual time.

It is to be noted that the start control of the present modification may be performed separately or together with the above-mentioned start control of the present embodiment. That is, when starting the vehicle 100, the control device 13 may judge whether or not there is a possibility of the failure in the startup of the fuel cell 2, based on at least one of the abnormal situation of the fuel cell 2 during the previous power generation, stored in the storage means, and the time for which the fuel cell 2 is left to stand during the stop, measured by the timer 81. Then, as a result of the judgment, when there is a possibility of failure, the timing t2 may be determined as the timing of "ready on".

INDUSTRIAL APPLICABILITY

The above-mentioned fuel cell system 1 can be mounted on a mobile body other than a two-wheeled or four-wheeled car, for example, a train, an airplane, a ship or a robot.

The invention claimed is:
1. A mobile body comprising:
a driving force generation device which generates a driving force of the mobile body;
a power accumulation device configured to supply a power to the driving force generation device;
a fuel cell configured to supply a power to the driving force generation device; and
a control device which controls driving of the driving force generation device,
wherein the control device prohibits to start driving the driving force generation device by the power supply of the power accumulation device, in a case where there is a possibility that startup of the fuel cell fails when starting the mobile body.

2. The mobile body according to claim 1, wherein the control device allows to start driving the driving force generation device after completion of the startup of the fuel cell, in the case where there is the possibility that the startup of the fuel cell fails when starting the mobile body.

3. The mobile body according to claim 1, wherein the control device allows to start driving the driving force generation device simultaneously with completion of the startup of the fuel cell, in the case where there is the possibility that the startup of the fuel cell fails when starting the mobile body.

4. The mobile body according to claim 1, wherein the control device starts driving the driving force generation device by the power supply of the power accumulation device, in a case where the control device judges that the startup of the fuel cell becomes successful when starting the mobile body.

5. The mobile body according to claim 4, wherein the control device switches the power supply to the driving force generation device from the power accumulation device to the fuel cell.

6. The mobile body according to claim 1, wherein the power accumulation device is configured to supply the power to the driving force generation device, before the fuel cell.

7. The mobile body according to claim 1, wherein while prohibiting to start driving the driving force generation device by the power supply of the power accumulation device when starting the mobile body, the control device executes a restoring operation to remove a factor for the failure in the startup of the fuel cell.

8. The mobile body according to claim 7, further comprising an apparatus to execute supply of a gas to the fuel cell and stop of the supply,
   wherein the control device executes the restoring operation by driving the apparatus so that the gas is supplied to the fuel cell.

9. The mobile body according to claim 8, wherein the control device drives the apparatus by supplying the power to the apparatus from the power accumulation device during the restoring operation.

10. The mobile body according to claim 1, wherein the control device judges based on a situation before the startup of the fuel cell whether or not there is a possibility of the failure in the startup of the fuel cell.

11. The mobile body according to claim 10, wherein the situation before the startup of the fuel cell is an abnormal situation during a previous power generation of the fuel cell.

12. The mobile body according to claim 11, wherein the control device prohibits to start driving the driving force generation device by the power supply of the power accumulation device, in a case where there was an abnormality during the previous power generation of the fuel cell, and the control device starts driving the driving force generation device by the power supply of the power accumulation device, in a case where there was not any abnormality during the previous power generation of the fuel cell.

13. The mobile body according to claim 10, wherein the situation before the startup of the fuel cell is a time for which the fuel cell is left to stand during stop.

14. The mobile body according to claim 13, wherein the control device prohibits to start driving the driving force generation device by the power supply of the power accumulation device, in a case where the leaving time exceeds a threshold value, and the control device starts driving the driving force generation device by the power supply of the power accumulation device, in a case where the leaving time is a threshold value or less.

15. The mobile body according to claim 1, further comprising a timer to measure a time for which the fuel cell is left to stand during stop,
   wherein the control device determines based on the leaving time measured by the timer whether to prohibit or allow to start driving the driving force generation device by the power supply of the power accumulation device when starting the mobile body.

16. The mobile body according to claim 1, further comprising storage means for storing whether or not there was any abnormality during a previous power generation of the fuel cell,
   wherein the control device determines, based on the storage of the storage means when starting the mobile body, whether to prohibit or allow to start driving the driving force generation device by the power supply of the power accumulation device.

17. The mobile body according to claim 1, wherein the mobile body is a vehicle.

* * * * *